United States Patent [19]

Simons et al.

[11] Patent Number: 4,768,133
[45] Date of Patent: Aug. 30, 1988

[54] LIGHTING DEVICE

[75] Inventors: Ronald H. Simons, Bishops Stortford; Basil S. Wilkinson, Goffs Oak; Ivor C. Henry, Enfield, all of Great Britain

[73] Assignee: Thorn EMI plc, London, England

[21] Appl. No.: 13,942

[22] Filed: Feb. 12, 1987

[30] Foreign Application Priority Data

Feb. 13, 1986 [GB] United Kingdom ............... 8603507

[51] Int. Cl.⁴ ............................................. F21V 8/00
[52] U.S. Cl. ...................................... 362/32; 362/293; 362/339
[58] Field of Search ................. 362/32, 293, 326, 339, 362/328

[56] References Cited

U.S. PATENT DOCUMENTS

| | | | |
|---|---|---|---|
| 4,141,058 | 2/1979 | Mizohata et al. | 362/32 |
| 4,460,940 | 7/1984 | Mori | 362/326 |
| 4,461,974 | 7/1984 | Chiu | 315/65 |
| 4,500,167 | 2/1985 | Mori | 362/32 |
| 4,664,470 | 5/1987 | Yerazunis | 350/166 |

FOREIGN PATENT DOCUMENTS

| | | |
|---|---|---|
| 23708 | 7/1984 | Australia . |
| 0115296 | 8/1984 | European Pat. Off. . |
| 0115843 | 8/1984 | European Pat. Off. . |
| 2542063 | 9/1984 | France . |
| 1270658 | 4/1972 | United Kingdom . |

Primary Examiner—Larry I. Schwartz
Attorney, Agent, or Firm—Fleit, Jacobson, Cohn & Price

[57] ABSTRACT

A lighting device includes a light pipe and a tungsten halogen reflector lamp transmitting light beams parallel with the axis of the light pipe. This allows the use of a dichroic filter which provides for an increased transmission whereby low wattage lamps (36 w) can be used instead of the more usual 100 to 200 w light sources. A number of shaped prisms can be used as end arrangements whereby different effects are obtained, for example, bi-directional, omni-directional or angled beams can be provided.

11 Claims, 2 Drawing Sheets

LIGHTING DEVICE

The present invention relates to a lighting device and it relates particularly to a lighting device suitable for use in connection with airport runways and the like to delineate or indicate runway edges and centre lines. Such devices are useful to aid pilots during landing and manoeuvreing after landing. A typical lighting device is designed to be mounted in a hole in the ground with only an upper portion from which light is emitted extending above ground level. An example of such a lighting device is disclosed in our United Kingdom Pat. No. 1270658 which is, in fact, bi-directional and comprises a robust housing assembly, a light source of 100 to 200 W and a simple optical assembly.

Because of the increase in air traffic it has become necessary to operate the aircraft in less than ideal conditions, for example, modern landing techniques allow aircraft to be landed in fog. Once on the ground, however, the pilot has to see to manoeuvre and in the poorer ambient conditions it has become necessary to increase the lighting effect. At the same time, however, because of the increase in airport acreage many more lighting devices are needed so that on the other hand for economy reasons it would be desirable to reduce the power of individual light source. A reduction in the power of the light source and a more efficient package therefore would be desirable.

An object of this invention is to provide an airport lighting device having at least in some respects some of the attributes mentioned above.

According to the present invention there is provided a lighting device comprising a housing and an optical assembly in the housing, wherein the optical assembly includes a light source for producing a beam of light, a light-pipe arranged to guide said beam parallel to a longitudinal axis of the assembly, a dichroic filter interposed between an end of the light pipe and the source, and an end arrangement for the light pipe effective to direct light, guided along the light pipe, in a predetermined direction. The end arrangement may direct light in a direction orthogonal to said longitudinal axis.

In the known arrangement described above, the lamp is located between two lenses and coloured glass filters. Dichroic colour filters which would have higher transmittance cannot be used because of the relatively large angles of incidence producing undesirably large colour changes.

It has been proposed that a possible solution would be the use of a single large light source and to lead off the light to various locations by means of fibre optics. Such a solution is not practicable because of the severe attenuation which would occur over long lengths of fibre.

So called light pipes or rods have been proposed for various applications, for example, in European Patent Application No. 115,296A mention is made of a quartz rod to transmit light to remote locations without any transfer of heat and without the hazard of electrical connections to replace explosion proof or water proof lighting equipment.

In FR No. 2542-063-A a transparent block is used with an unpolished inclined edge to provide a diffuse light for interior lighting and advertising and European Patent Application No. EP-115-843-A discloses a driven optically conductive rod with an inclined light reflecting end used to provide time shared light in the cultivation of tomatoes. None of these applications describe or suggest the use of a light rod to solve a particular problem in runway lighting devices. Moreover, the usefullness of the light rod in the prior applications resides in the ability of the rod to transmit light to remote locations. There is no suggestion of using a light rod to provide a compact means of distributing light bi-directionally or omnidirectionally other than in conjunction with a driven rotary member.

An embodiment of the present invention will now be described by way of example only and with reference to the under-noted drawings wherein.

Figure 1:
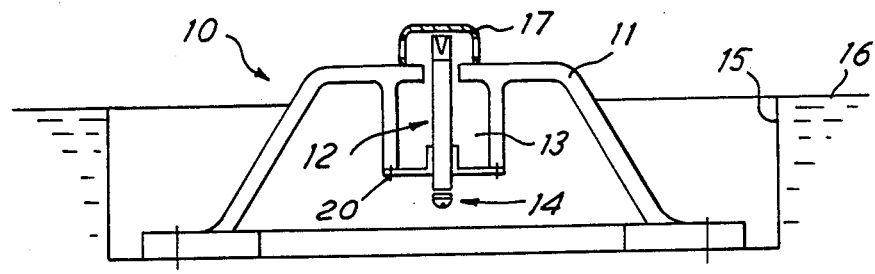
FIG. 1 is a sectional view of an assembled airport lighting device in accordance with the invention.

In FIG. 1, reference numeral 10 depicts generally an airport lighting device comprising a housing 11, optical assembly 12 located in a well 13 of housing 11 by screws 20 and a light source 14. The airport lighting device 10 sits in a recess 15 in a runway 16 and light is emitted from dome 17 just above the surface of the runway 16.

Figure 2:
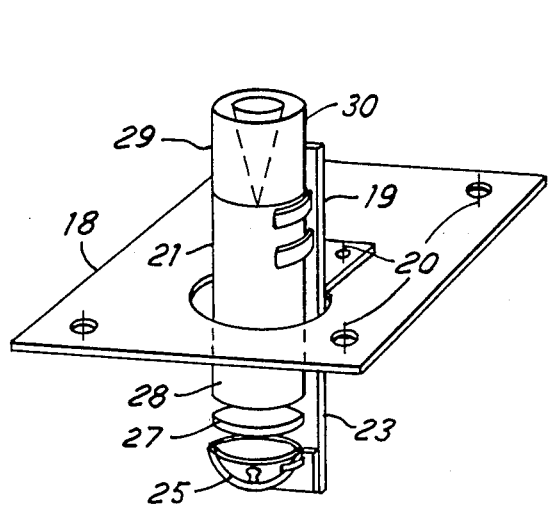
FIG. 2 is a pictorial view of an optical assembly for use in the lighting device of FIG. 1.

Optical assembly 12 is shown in greater detail in FIG. 2 and comprises a flat light metal frame 18 to which bracket 19 of similar metal is attached by screws 20. A light pipe 21 is carried by spring clips 22 attached to bracket 19 which also supports a further bracket 23 best shown in FIG. 3. Bracket 23 also carries spring clips 24 which secure light source 14 in alignment with light pipe 21. Light source 14 is, in fact, a tungsten halogen reflector lamp 25 and because it more nearly simulates a point source and because the reflector 26 is in alignment and light is transmitted parallel, to the longitudinal axis of light pipe the overall efficiency of the lighting device is enhanced. In this regard it has been found a 36 W tungsten halogen lamp in the arrangement of the present invention can be substituted for the 100 to 200 W light source of the prior art device described in the aforesaid U.K. Pat. No. 1270658. Moreover, because the tungsten halogen incandescent reflector lamp emits light parallel to the light pipe 21 a dichroic filter 27 can be interposed between the end 28 of the light pipe 21 and the reflector lamp 25 and supported also from bracket 23. This substantially solves the aforementioned colour changing problem and also improves the efficiency of the device because the dichroic filter has a transmission of about double that of the aforementioned glass filter.

Figure 3:
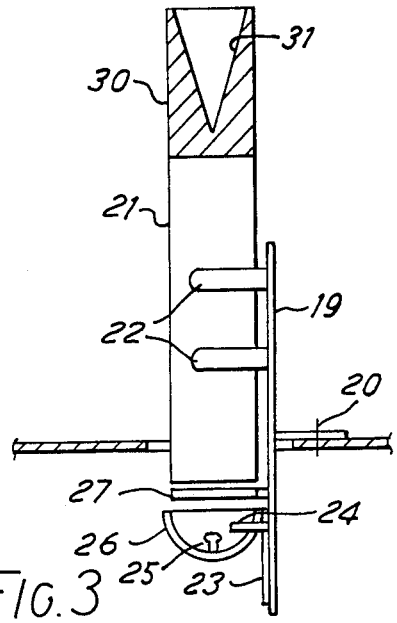
FIG. 3 is a sectional view of the optical assembly of FIG. 2.
Figure 4:
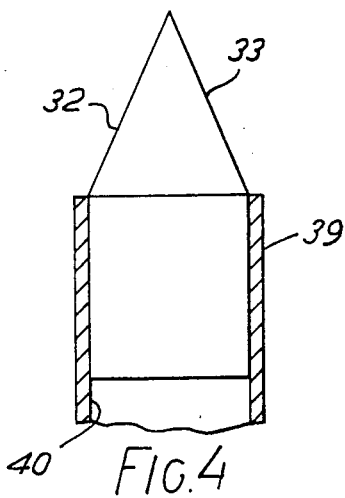
FIG. 4 is a view of an alternative form of tip member used in the optical assembly of FIG. 2.
Figure 5:
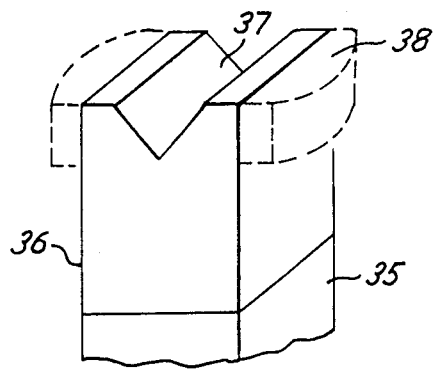
FIG. 5 is a view of an alternative form of tip member.

Light pipe 21 can be made from a single piece of transparent rod i.e. glass or quartz rod or it can be made from a cylindrical length of transparent rod to which is joined a tip member 29 for example, by a suitable adhesive dependant on the refractive index of the material. In FIGS. 2 and 3 the tip member 29 is in the form of a cylindrical plug 30 of quartz or glass having an internal V-shaped axially aligned depression 31 with the particular angle of the V depending on the refractive index of the material. In the present example the material is quartz and the angle is 42°. The V-shaped depression takes the parallel beams of light from the reflector lamp 25 and turns them through 90° to emit light around a 360° circumference when looked at in the plan view. Thus from a static light source 14 an omni-directional beam of light can be provided by means of tip 29. An alternative form of tip 32 is shown in FIG. 4 having an external apex 33. Testing has shown that tip 29 with the internal depression 31 is about 60% efficient whereas the external tip 32 is only about 30% efficient which is surprising since theoretically the efficiency should be about the same. FIG. 5 shows an alternative form of light pipe having a rectangular section with a tip member 36. Tip 36 has a horizontal V-shaped groove 37 which produces a bi-directional beam. Such a horizontal V-shaped groove could be produced in a circular section light pipe. Tip 36 can be made complete with integral lens portion 38, shown dotted.

In contrast to the previously described embodiments where compact light sources are located at ground level the approach lights on a runway are located on elevated stands, sometimes as high as twenty feet or more. Under these circumstances it is useful to have the light source at ground level and to lead the light to the elevated distribution point by means of a relatively long light pipe. Because the light pipe has to withstand wind forces in these remote parts of the runway and because of the relatively long vertical runs of the pipe the usual glass or quartz rod does not have sufficient structural strength and, indeed, dependent on the length, could be too expensive to be commercially viable. Accordingly the transparent rod has to be reinforced, for example, by being encased in a metal sheath. Alternatively the light pipe could be in the form of a suitably strong tube with an appropriate specular internal finish. Because of the length involved there is a requirement for increased power and a tungsten halogen incandescent reflector lamp of 50–70 W would be used in combination with a 2–3" dia reflector. However, because of the increased efficiency of the arrangement of the present invention due to the use of the dichroic filter in combination with a parallel light beam this is still less than 100–200 W light source of the aforementioned prior art arrangement.

FIG. 4 shows external tip 32 fitted to the end of a metal tube 39 having an aluminised internal surface 40. In this embodiment the tube would have a nominal diameter of 3 inches.

Figure 6:
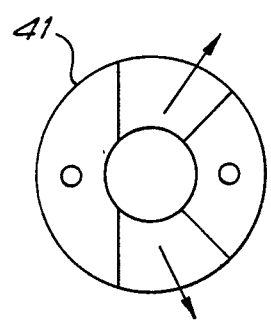
FIG. 6 is a plan view of an airport lighting device for use on curved sections of runway.
Figure 9:
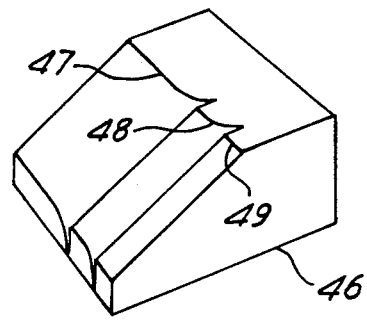
FIG. 9 is a perspective view of one of the prisms in FIG. 7.
Figure 7:
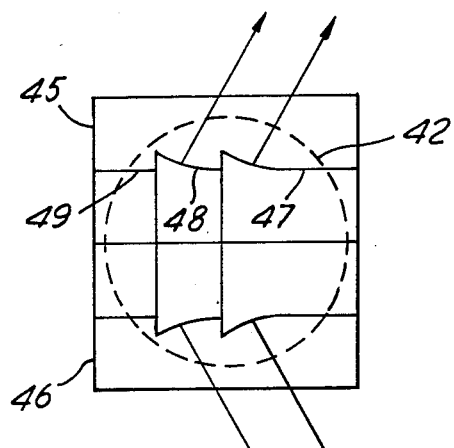
FIG. 7 is a plan view of prisms used in the device of FIG. 6.
Figure 8:
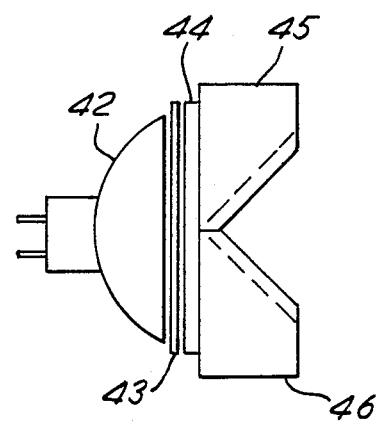
FIG. 8 is an optical assembly for use in the airport lighting device of FIG. 6.

In the particular case where the lighting device is to be used on curved sections of airport runways it is useful to provide a lighting device where the light beams are angled to the axis of the light fitting. They have to be "toed in" and "toed out" as indicated by the arrows shown in the lighting device 41 of FIG. 6. This "toeing" or angling can be accomplished by the use of offsetting prisms shown in FIGS. 7, 8 and 9. In FIG. 8 there is shown an assembly comprising a tungsten halogen reflector lamp 42, dichroic filter 43, a short length of light pipe 44 made of glass and left and right handed glass prisms 45, 46 respectively. The prisms are assembled loosely together which is useful if they have to be changed, for example, to provide different coloured beams. Facets 47, 48 and 49 produce the required amount of angling as shown in FIG. 7. A right handed prism 46 is shown in perspective view in FIG. 9. In some cases the light pipe 44 may be omitted and the prisms 45, 46 can be used in combination with the assembly comprising tungsten halogen reflector lamp 42 and dichroic filter 43.

It will be appreciated that light metal frame 18 of FIG. 2 with the assembled optical devices will quickly give up heat generated by light source 14 to the more substantial housing 11 which thus acts as a heat sink. Moreover, upward passage of heat into frame 18 can be retarded by using a dichroic heat screen instead of or additional to dichroic colour filter 27. It is useful to keep housing 11 cool in the event of aeroplanes inadvertently parking with their tyres on or close to the housing 11 which might well damage the tyres if such parking persisted for a lengthy period. The ability of the light pipe to transmit light 'cold' also helps in this respect.

A lighting device in accordance with the invention could alternatively be used as a lane indicator lamp in a road or motorway.

We claim:

1. A lighting device comprising a housing and an optical assembly in the housing, wherein the optical assembly includes a light pipe having a first end and a second end opposite said first end and a longitudinal axis between said first end and said second end; a light source for producing a beam of light, the light source being positioned at said first end of said light pipe, the light pipe being arranged to guide said beam parallel to said longitudinal axis of the light pipe; a dichroic filter interposed between said first end of the light pipe and the light source; and an end arrangement positioned at said second end of the light pipe, said end arrangement being effective to direct light, emergent from said second end, in a predetermined direction away from said longitudinal axis.

2. A lighting device according to claim 1 wherein said end arrangement directs light in a direction orthogonal to said longitudinal axis.

3. A lighting device according to claim 1 wherein the end arrangement directs the light beam bi-directionally.

4. A lighting device according to claim 1 wherein the end arrangement directs the light beam around a 360° circumference.

5. A lighting device according to claim 1 wherein said end arrangement comprises left and right hand facetted prisms for directing the light beam in respective directions.

6. A lighting device according to claim 1 including a heat screen.

7. A lighting device according to claim 1 wherein the end arrangement includes a prism having a V-shaped formation.

8. A lighting device according to claim 7 wherein the V-shaped formation is an internal depression.

9. A lighting device according to claim 1 wherein the light pipe is reinforced in a metal sheath.

10. A lighting device according to claim 1 wherein the light pipe is a quartz or glass rod.

11. A lighting device according to claim 1 wherein the light pipe is a metal tube.

* * * * *